No. 717,579. PATENTED JAN. 6, 1903.
L. W. JOHNSON.
PIPE WRENCH.
APPLICATION FILED MAY 17, 1902.
NO MODEL.
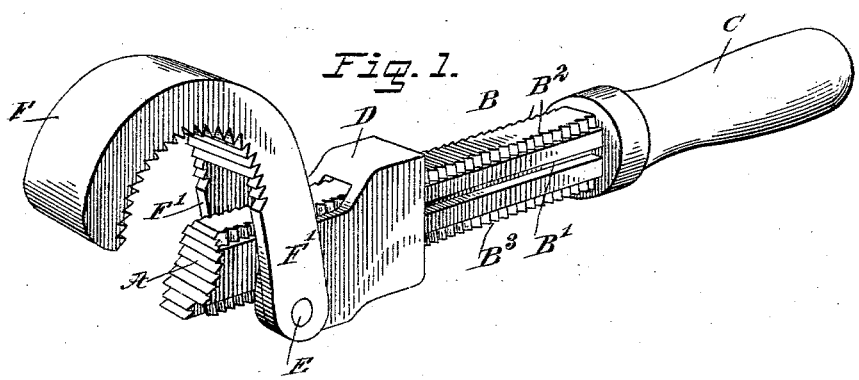
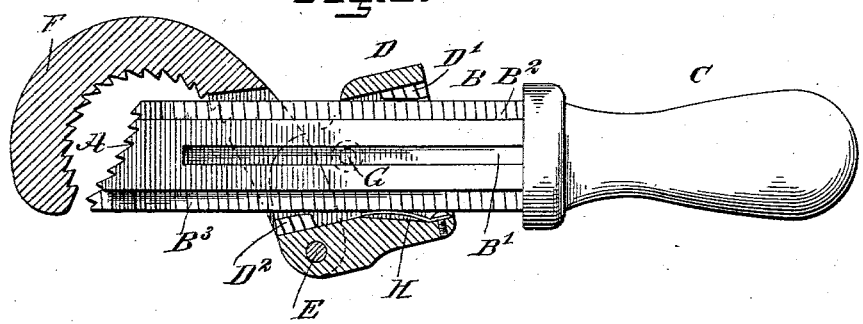
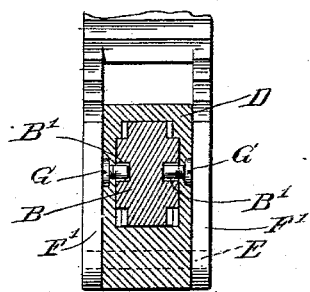
WITNESSES:
James F. Duhamel
Theo. G. Hoster
INVENTOR
Lafayette W. Johnson
BY
ATTORNEYS

UNITED STATES PATENT OFFICE.

LAFAYETTE W. JOHNSON, OF JEROME, ARIZONA TERRITORY, ASSIGNOR TO CHAS. E. NATHHORST AND CHAS. W. WOODS, OF JEROME, ARIZONA TERRITORY.

PIPE-WRENCH.

SPECIFICATION forming part of Letters Patent No. 717,579, dated January 6, 1903.

Application filed May 17, 1902. Serial No. 107,772. (No model.)

*To all whom it may concern:*

Be it known that I, LAFAYETTE W. JOHNSON, a citizen of the United States, and a resident of Jerome, in the county of Yavapai and Territory of Arizona, have invented a new and Improved Pipe-Wrench, of which the following is a full, clear, and exact description.

The invention relates to wrenches such as shown and described in the Letters Patent of the United States No. 698,288, granted to me April 22, 1902.

The object of the invention is to provide a new and improved pipe-wrench which is simple and durable in construction and arranged to permit of conveniently, quickly, and accurately adjusting the movable jaw relative to the fixed jaw according to the diameter of the work under treatment and to securely grip the work for turning the same without danger of the jaws slipping from the work.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1 is a perspective view of the improvement. Fig. 2 is a longitudinal sectional elevation of the same, and Fig. 3 is a cross-section of the same.

The fixed jaw A of the pipe-wrench is formed on the forward end of the shank B, carrying at its rear end the usual handle C, adapted to be taken hold of by the operator for manipulating the wrench, as hereinafter more fully described, and on the said shank B is mounted to slide longitudinally a sleeve D, carrying in its bottom portion a transversely-extending pivot E, on which are fulcrumed the fork members $F'$ of a hook-jaw F, toothed at the inner edge to operate in conjunction with the oppositely-located teeth of the fixed jaw A to securely grip the work on diametrically opposite points.

The sleeve D is provided in its sides with trunnions G, extending into longitudinal grooves $B'$, formed in the sides of the shank B, so that the trunnions form a fulcrum for the sleeve to rock on to move interior sets of diagonally-disposed teeth $D'$ $D^2$ of the sleeve D in or out of mesh with rows of teeth $B^2$ $B^3$, formed on the sides of the shank B at the top and bottom thereof, as plainly indicated in the drawings. The trunnions G also serve as guides in moving the sleeve D forward or backward on the shank B at the time the teeth $D'$ $D^2$ are out of mesh with the rows of teeth $B^2$ $B^3$.

A flat spring H is secured to the bottom of the sleeve, at the inside thereof, and presses on the under side of the shank B to normally hold the sleeve in such a position that the teeth $D'$ $D^2$ are in mesh with the rows of teeth $B^2$ $B^3$ to hold the said sleeve against longitudinal movement on the shank B. (See Fig. 1.) Now it will be seen that when it is desired to move the sleeve D on the shank B it is necessary to swing the sleeve into the position shown in Fig. 2—that is, to disengage the teeth $D'$ $D^2$ from the rows of teeth $B^2$ $B^3$, and the sleeve can now be moved forward or backward on the shank to bring the hook-jaw F into proper engagement with one side of the work, it being understood, however, that the fixed jaw is already moved in engagement with the work on the side thereof located opposite the one engaged by the hook-jaw F. When the jaws A and F are in engagement with the work, then the operator releases the sleeve D, so that the spring H swings the sleeve D into a locked position on the shank B, and the operator now bears down on the handle C to turn the work gripped between the jaws F and A.

By reference to Fig. 2 it will be seen that the pivot E for the hook-jaw F is located forward of the trunnions G, while the spring H is located rearward of the said trunnions, so that the strain exerted by the jaw F on the sleeve D is in the same direction in which the spring H holds the sleeve in a locked position, and consequently the sleeve is held in this locked position without further strain on the spring H as long as the wrench is used for turning the work, as previously explained.

The grooves $B'$ extend from the inner end of the handle C to within a short distance of the jaw A, so that the sleeve D cannot accidentally slip off the said shank, and consequently the several parts of the wrench are not liable to become accidentally detached.

Having thus described my invention, I claim as new and desire to secure by Letters Patent—

1. A pipe-wrench, comprising a jaw, a shank grooved and toothed on its sides and on which the jaw is fixed, a sleeve having trunnions engaging the side grooves in the said shank, to allow of sliding and turning the sleeve on the shank, the said sleeve having interior teeth located at diametrically opposite points and adapted to engage the side teeth on the shank, a spring pressing the sleeve, to hold its teeth in engagement with the shank-teeth, and a hook-jaw fulcrumed on the said sleeve and adapted to exert a strain on the sleeve in the same direction in which the sleeve is pressed by the spring, as set forth.

2. A pipe-wrench, comprising a fixed jaw, a shank carrying the said jaw and formed in its sides with longitudinal grooves terminating a distance from the jaw, the sides of the shank being also formed with rows of teeth, a sleeve having trunnions engaging the said grooves in the sides of the shank, to allow of sliding and turning the sleeve on the shank, the sleeve having interior teeth located at diametrically opposite points and adapted to engage the side teeth on the shank, a spring secured to the interior of the sleeve at the bottom thereof and pressing against the under side of the shank, to one side of the trunnions, and a hook-jaw fulcrumed on the bottom of the sleeve on the opposite side of the trunnions, as set forth.

In testimony whereof I have signed my name to this specification in the presence of two subscribing witnesses.

LAFAYETTE W. JOHNSON.

Witnesses:
JOHN W. ROSS,
JOHN T. SHEFFIELD.